United States Patent Office 3,634,564
Patented Jan. 11, 1972

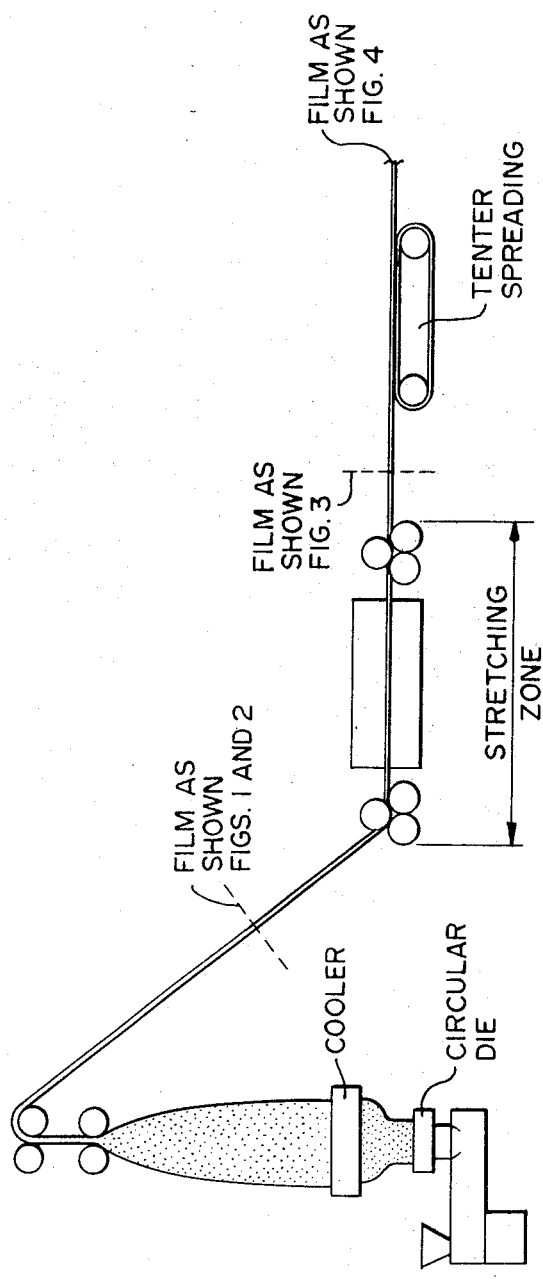

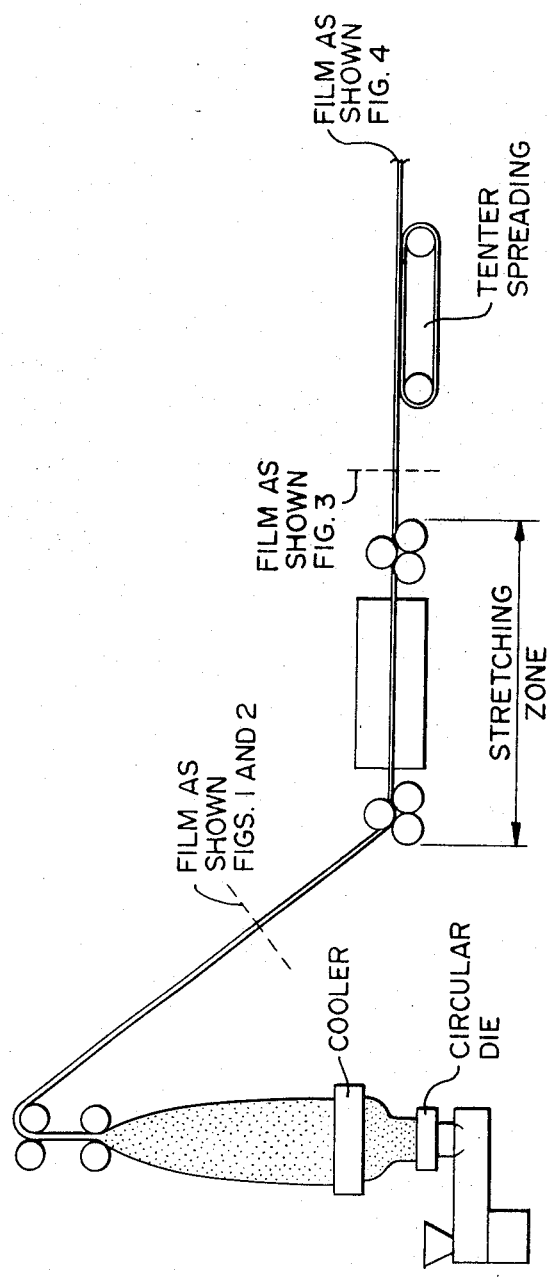

3,634,564
PROCESS FOR THE MANUFACTURE OF
FIBRILLATED FOAMED FILMS
Katsumi Okamoto, Iwakuni-shi, Seiya Iwama, Yokkaichi-shi, and Sanshiro Ozawa and Tutomu Moriwaki, Yamaguchi-ken, Japan, assignors to Mitsui Petrochemical Industries, Ltd., Tokyo, Japan
Filed Nov. 24, 1967, Ser. No. 685,693
Claims priority, application Japan, Dec. 1, 1966, 41/78,336; June 21, 1967, 42/32,280
Int. Cl. B29d 7/24, 27/00
U.S. Cl. 264—54
4 Claims

ABSTRACT OF THE DISCLOSURE

Process for the manufacture of fibrillated films from a thermoplastic resin, which comprises stretching a film of a film-forming synthetic thermoplastic resin having uniformly dispersed therein closed voids having an average diameter in a direction of thickness of $3/40$ to $30/40$ of the thickness of the film and having a void ratio of 0.1 to 0.6 at a stretch ratio of 2 to 12 in its longitudinal direction thereby to fibrillate the said film.

---

This invention relates to a novel process for the manufacture of fibrillated films composed of a thermoplastic synthetic resin. Particularly, it relates to a process for the manufacture of fibrillated films which, when developed in a transverse direction, can be yarn-like and woven fabric-like materials having a network fibrillated structure, and also of the said yarn-like and woven fabric-like materials.

Filaments of synthetic thermoplastic resins are mostly produced by a melt-spinning method. Polyolefines such as high density polyethylene and polypropylene, however, are not easy to spin because of their high melt viscosity at processing temperatures, and the resulting filaments, especially those of a small denier, tend to be broken or subject to irregularity in denier. With a view to overcoming these difficulties, a process for producing a so-called split yarn has proposed in recent years by which a film of a thermoplastic resin is stretched in one direction, oriented to a high degree, split, and made into a fiber form by an appropriate means. To accomplish this end, known are the method of splitting a stretched and oriented film by a mechanical force exerted perpendicularly to it, the method of beating a stretched film by a beater, the method of adding fine explosives to a film, stretching the film and initiating the explosive from inside to thereby split the film, and the like. Any of these methods needs two steps, that it, stretching and splitting, and a resulting network material has a very irregular network, and it is impossible to make the widths of its strands too narrow.

We have found that when a film of a thermoplastic resin having specific voids inside is stretched along its length, a novel fibrillated film manifesting a uniform network-fibrillated structure can be obtained merely by developing the film in a transverse direction. Accordingly, this invention provides a process for the manufacture of fibrillated films from a thermoplastic synthetic resin, which is characterized by stretching a film of a film-forming thermoplastic synthetic resin having uniformly dispersed therein closed voids having an average diameter in a direction of thickness of $3/40$ to $30/40$ of the thickness of the film and having a void ratio of 0.1 to 0.6, at a stretch ratio of 2 to 12 in its longitudinal direction thereby to fibrillate the said film.

In other words, the present invention is a process for splitting a film by mixing a thermoplastic resin with a blowing agent, melting and kneading the mixture to disperse the blowing agent therein, extruding it into a foamed resin film, and thereafter stretching the foamed film uniaxially. By stretching the foamed film in this manner, microporous voids uniformly and three-dimensionally dispersed in the film are extended in a thin tubular form, and at the same time, the resin molecules are oriented in the direction of stretching. Thus, three-dimensional fine splittings readily occur.

Any film-forming thermoplastic resin can be used as the starting resin in this invention. Examples of the thermoplastic resin are polyolefines such as polyethylene, polypropylene, polybutene-1, poly(4-methylpentene-1), and polystyrene; copolymers of olefines such as an ethylene/vinyl acetate copolymer and an ethylene/acrylic ester copolymer, chlorine-containing polymers, such as polyvinyl chloride, polyvinylidene chloride and a vinyl chloride/vinylidene chloride copolymer; polyesters such as polyethylene terephthalate, a polyethylene terephthalate/isophthalate copolymer and super polyamides such as polycaprolactam and polyhexamethylene adipamide. Among these, polyolefines such as high density polyethylene and polypropylene are especially suitable because of their high strength.

Before the formation of a film, a blowing agent is mixed with the starting resin and dispersed therein. As the blowing agent usable in this invention, we can mention inert blowing agents such as nitrogen and carbon dioxide, liquid blowing agents such as water, low boiling hydrocarbons such as butane and heptane, and low boiling halogenated hydrocarbons, and powdery blowing agents such as sodium bicarbonate, a mixture of sodium bicarbonate and an organic acid, ammonium carbonate, diethylazo diformate, dinitrosopentamethylene tetramine, azodicarboamide, azoisobutyronitrile, derivatives of hydrazide such as benzenesulfonyl hydrazide, p,p'-oxybis(benzenesulfonyl hydrazide).

According to this invention, it is preferable to use blowing agents which evolve comparatively less amount of gas, in order to introduce fine voids uniformly into a film. In general, it is preferable that an amount of gas to be evolved from the blowing agent per gram of the blowing agent at the film-forming temperature is 30 to 150 ml.

An amount of the blowing agent to be added to the starting resin varies considerably depending upon an amount of gas evolved or a film-forming temperature, but can be determined by those skilled in the art by simple experiments so that the void ratio of a formed film may be 0.1 to 0.6.

In this invention, as an assistant to split out a foamed film a finely divided solid nucleus-forming agent may be used with a blowing agent in the form of gas, liquid or solid. Generally usable as the powdery solid are preferably white powdery inorganic solids which are not melted at the shaping temperatures of the resin, such as calcium sulphate, borax barium sulphate, barium carbonate, aluminium oxide, silica, zinc oxide, and magnesium carbonate.

In this invention, it is possible to use, as the solid blowing agent, a finely divided powder of inorganic solids such as aluminium oxide, aluminium sulphate, calcium chloride, magnesium chloride, barium chloride, sodium carbonate, sodium sulphate, Glauber's salt, borax iron alum and potassium alum either in the form containing crystal water or in the form wetted by water or other liquid swelling agent. Such blowing agents evolve a gas generally in a small amount and the solid acts also as a nucleus-forming agent, or an assistance of splitting.

The resulting foamable molten resin is extruded into films by a method known per se. In this invention, a blowing agent must be dispersed uniformly into a film, in order to form fine and uniform voids.

The formation of films can be carried out either by a tubular film method or by a T-die method. The filmextrusion temperature is not restricted, and can vary from the upper limit of the melting point of a thermoplastic resin to the degradation temperature of the resin, by taking into consideration the blowing temperature of incorporated blowing agent. There is no particular restriction either on an extruding pressure, but it is not preferable if there is a big difference in pressure between a die and a cylinder head.

Thus, an unstretched film of a thermoplastic resin having uniformly dispersed therein closed voids having an average diameter in the direction of thickness of $\frac{1}{40}$ to $\frac{30}{40}$, preferably $\frac{1}{25}$ to $\frac{10}{25}$ of the thickness of the film and having a void ratio of 0.1 to 0.6, preferably 0.15 to 0.35 is obtained. By the term "void ratio" used in the specification and appended claims is meant a quotient obtained by dividing a volume of voids in a film by an apparent volume of a film.

The important feature of this invention resides in the use of a starting film having a void ratio and an average diameter of void within the above specified ranges. When a void ratio is greater than 0.6, and/or an average diameter of a void in the direction of thickness is larger than $\frac{30}{40}$ of the thickness of the film, it is impossible to give a sufficient stretching for fibrillating the film. When the void ratio is smaller than 0.1, and/or the average diameter of the void in the direction of thickness is smaller than $\frac{1}{40}$ of the thickness of the film, it is difficult to split the stretched film to introduce a uniform network structure into it. Only by choosing the void ratio and the void diameter within the above specified ranges, it is possible to fibrillate the film by stretching and split it to introduce into the film a uniform network structure.

Starting films preferable for the objects of this invention have in general a thickness of 0.03 to 0.5 mm., preferably 0.05 to 0.3 mm.

For better understanding of this invention, reference may be made to the accompanying drawings in which:

FIG. 3 is an enlarged plan view showing the state of a foamed film after stretching, from which it is seen that closed voids are extended by a stretch ratio and distributed in thin tubular forms;

Figure 1:
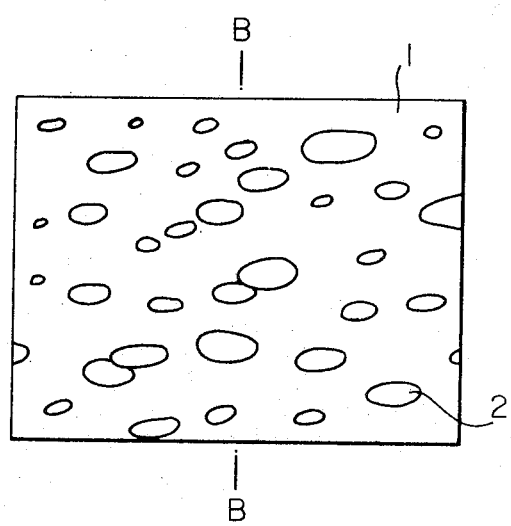
FIG. 1 is an enlarged plan view of an unstretched foamed film of high density polyethylene used as the starting material according to the process of this invention, in which reference numeral 1 shows a resin portion, and numeral 2 shows oval shaped voids deformed in the extruding direction.
Figure 2:
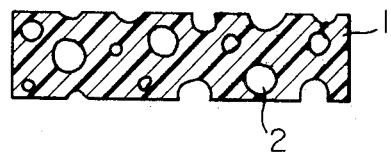
FIG. 2 is a sectional view of the film of FIG. 1 taken along the line B—B.

FIG. 4 is an enlarged plan view of a network fibrous material obtained by developing the film in a direction transverse to the molecular orientation of the film; and FIG. 5 is a diagrammatic representation of the process of the present invention illustrating the blowing of the film, stretching of the blown film and spreading of the same, showing wherein the films corresponding to FIGS. 1 through 4 are obtained.

One example of the conditions for the foamed film of the invention is as follows:

The thickness of the film is ordinarily 0.03 to 0.5 mm., preferably 0.05 to 0.3 mm. The size in the direction of thickness of the voids dispersed in it is 0.003 to 0.005 mm$\phi$ for the film thickness of 0.05 mm., and 0.004 to 0.01 mm$\phi$ for the film thickness of 0.08 mm., particularly preferably 0.005 to 0.007 mm$\phi$. The thickness of walls defining the voids is about 0.015 to 0.02 mm., preferably at least 0.001 mm.

According to the process of this invention, the above-mentioned foamed film is fibrillated by stretching it at a stretch ratio of 2 to 12, preferably 3 to 9. The usable stretch ratio varies considerably depending upon species of starting resins and a void ratio of the foamed film, but can be optionally chosen so that the film may be sufficiently fibrillated, and a desired strength in a final product may be achieved. Generally, it is preferable that when a ratio and/or a size of voids is small, a large stretch ratio is used, or vice versa. The stretching temperature is not particularly restricted, and may vary from room temperature to a temperature 10° C. lower than the melting temperature of a thermoplastic resin. When the stretching is effected at high temperature, such heating medium as hot air bath, hot water, boiling water and steam can be used. The stretching of the film can generally be carried out between two pairs of rolls having a different rotating speed at a stretching rate of 50 to 500 m./min.

An example of an amount of a blowing agent to be added, stretch ratio, stretching rate, and stretching temperature is tabulated below with respect to high density polyethylene.

| | | |
|---|---|---|
| An amount of a blowing agent based on the weight of the resin percent | 1 | 3 |
| Void ratio | 0.21 | 0.42 |
| Average diameter of the void in the direction of thickness/thickness of film | 0.008 | 0.004 |
| Stretch ratio | 7 | 6 |
| Stretching rate, m./min | 70 | 70 |
| Stretching temperature, ° C | 98 | 98 |

According to the above-mentioned procedures, a film having uniformly dispersed therein microporous voids is stretched, and a molecular orientation is effected throughout the film, whereby strength is imparted along the stretching direction, and simultaneously the voids are extended in thin tubular forms according to the stretch ratios, thus splitting the film. The obtained film had innumerable narrow slits by the stretching of the void and film resin.

Thus, according to the process of the invention, fibrillated films are obtained. The fibrillated film of this invention has an appearance of a non-transparent integrated film having many narrow slits or splittings in its longitudinal direction. The fibrillated films of this invention are pliable, non-transparent, hard to slide, and tenacious, and can be used directly in such applications as yarns, and ropes. It is also possible use the fibrillated film of this invention in various applications as the yarn-like and woven fabric-like materials by developing it by a known means to manifest a network fibrillated structure. The developing of fibrillated films can be easily carried out without scarcely necessitating a mechanical force, by a tenter, static electricity or jetting it out together with a high velocity gas after treatment of a crimper and a bobinner. Thus, a developed film always manifests a uniform fibrillated network structure, as in the case of beating and developing phloem fibers. The split fiber of the present invention has a deformed cross-section in its single fibers because it is split three-dimensionally. It is a very complicated cross-section unlike a circular cross-section obtained by melt-spinning or a rectangular cross-section generally obtained by splitting. Such a cross-section is closely similar to the cross-section of natural fibers such as cotton and jute, and can give a web having a suitable smoothness and soft touch. The denier of the single fibers of the split fiber can be determined depending on the amount of the blowing agent, the degree of its dispersion, and the stretch ratio. Having a complicated network structure, the yarn-like materials of this invention are bulky and pliable and have less fluff, showing the properties like those of spun yarns. They can be used directly in such applications as clothing, yarns for industrial purposes, non-woven web, ropes, and cords. It is also possible to divide the yarn-like material in optional widths, and make it into continuous filaments of a desired denier. Or, it is possible to draft and cut the yarn-like material in appropriate lengths, make it into continuous slivers, and spin them to make spun yarns.

The obtained woven fabric-like materials having a large width can be used directly, or after having been laminated, used in such applications as mats, carpets, filters, various fabrics, non-woven fabrics and fibrous stuffings. Further-more, the splitting of the fibrillated film of this invention occurs three-dimensionally between the thin tubular voids. Thus, the fibril structure of the fibrillated film of this invention is smaller and more complicated than known split yarns. It is generally known that a fibrillated film is obtained by stretching a film of a thermoplastic resin to a high degree. When such known fibrillated film is developed in a direction transverse to its stretching axis, only long splittings appear in a direction of the stretching axis, and it is impossible to develop a network fibrillated structure. When a specific foamed film is stretched as in this invention, however, a fibrillated film having a network fibrillated structure is obtained. This is quite unexpected from the above known facts.

Moreover, the process of this invention, does not necessitate a particular splitting step such as of pulling a stretched film mechanically in a width direction, or of beating it by a beater. Thus, according to the process of this invention, split yarns of finer denier can be produced by less steps than the conventional methods of producing split yarns. It was the case with the conventional methods that because of the need of a particular splitting step, the widths and the denier of produceable split yarns are considerably restricted in view of an apparatus to be used in this step. On the contrary, the process of this invention does not necessitate such splitting step at all, and it is possible to produce articles having a far larger width than the conventional ones.

EXAMPLE 1

Two parts of Hydra-8 (mixture of hydrazodicarboamide 80 mol percent and azodicarbonamide 20 mol percent, product of Ohtsuka Kagaku Yakuhin Kabushiki Kaisha, Japan) was mixed under stirring with 4 parts of precipitated barium sulphate by means of a juice mixer for 30 seconds. The resulting mixture was further mixed with 100 parts of powdery high density polyethylene (Hi-zex 3300F, product of Mitsui Petrochemical Industries, Ltd.) having a melt index of 0.9 for 30 seconds by a Henschel Mixer. The obtained mixture was made into films having thickness of 0.12 mm. and a folded width of 110 mm. by using an air-cooling inflation film-making apparatus consisting of an extruder having a screw diameter of 40 mm. $\phi$ fitted with a circular die having an inner diameter of 100 mm. The extruding conditions were as follows:

Temperature of:
    Barrel 1 _____ ° C__ 130
    Barrel 2 _____ ° C__ 150
    Barrel 3 _____ ° C__ 160
    Head _____ ° C__ 160
    Circular die _____ ° C__ 165
    Screw rotation _____ r.p.m__ 60
    Resin pressure _____ kg./cm.$^2$__ 95
    Take-up speed _____ m./min__ 12

The obtained unstretched film had a void ratio of 0.76. The cell had a length in the axial direction of the film of 0.82 mm., a width of 0.1 mm., and a thickness of 0.0043 mm.

The obtained film was stretched at a stretch ratio of 8.0 at a stretching temperature of 99.5° C. The delivery speed was 10 m./min., and the take-up speed was 80 m./min. The resulting stretched film had an appearance shown in FIG. 3, and possessed a property of being very easily fibrillated. It was made into a net work fibrous web by developing in the transverse direction in the following manner.

With the use of a stuffer device consisting of rubber nip rolls having a hardness of 85° C., the stretched film was fed at a rate of 80 m./min. and subjected to a crimping treatment. Then, it was split and developed by an air ejector filled with a 9.8–10 kg./cm.$^2$ of compressed air, at a rate of 60 m./min.

The obtained network fibrous web had an appearance shown in FIG. 4, and possessed a tensile strength of 3.7 g./d.

The above-mentioned mixture of hydrazine derivative and azodicarbonamide used as a blowing agent yields about 60 ml./gr./180° C. of gas. The gas composition measured of the time of decomposition at 270° C. is 50% of $CO_2$, 40% of $N_2$, 10% of $NH_3+CO$.

EXAMPLE 2

Five parts of diatomaceous earth and 0.5 part of azodicarbonamide (Uniform AZ-H, product of Ohtsuka Kagaku Yakuhin Kabushiki Kaisha, Japan) were mixed in the same manner as in Example 1, and the resultant mixture was further mixed with 100 parts of high density polyethylene (Hi-zex 3300F). The obtained mixture was extruder under the same conditions as in Example 1 to make films having a thickness of 0.08 mm. and a folded width of 100 mm. The void ratio was 0.42, and the cell had a length in the axial direction of the film of 0.45 mm., a width of 0.1 mm. and a thickness in the thickness direction of the film of 0.02 mm. The film was then stretched to 5 times the original length by means of a boiling water stretcher of the same type as in Example 1 to make a fibrillated film having a strength of 2.1 g./d. A network web was obtained by means of the same air ejector as in Example 1.

Since the azodicarbonamide used as a blowing agent generated a large amount of gas, the size of the cell got larger. Also, there was a tendency of the strength being lowered because of a poor stretch-ability of the film.

EXAMPLE 3

Two parts of Hydra-8 was mixed with 3 parts of barium sulphate in the same manner as in Example 1, and the resulting mixture was further mixed with 100 parts of high density polyethylene (Hi-zex 3000S) having a molecular weight of 60,000. The resulting mixture was made into films in the same manner as in Example 1. The film had a thickness of 0.199 mm., and a folded width of 100 mm. The cell had a width of 0.08 mm., a length of 0.43 mm. and a thickness of 0.009, and the void ratio was 0.37. The film was stretched at the ratio indicated below, and attained the following strength and elongation.

| Stretch ratio | Strength (g./d.) | Elongation percent |
| --- | --- | --- |
| 3.5 | 1.32 | 107 |
| 4.5 | 1.77 | 54 |
| 6.2 | 2.94 | 19 |
| 7.2 | 3.1 | 16 |
| 7.5 | 3.5 | 14 |
| 8.8 | 3.9 | 11 |

Those films stretched to more than 6 times the original lengthe were treated on a bobinner, and the fibrils were grown by an air ejector filled with 10 kg./cm.$^2$ compressed air. There was obtained a network fibrillated web having a monofilament denier of 5 to 30 denier.

EXAMPLE 4

Two parts of Hydra-8, 6 parts of barium sulphate and 100 parts of isotactic polypropylene having a melt index of 10 were mixed with each other in the same manner as in Example 1. The mixture was made into films by means of a water-cooling inflation film-making device fitted with a water cooling jacket. The film had a void ratio of 0.22, and a thickness of 0.08 mm. The obtained film was stretched to 6 times the original length in a boiling water in the same manner as in Example 1, and then a split film having a strength of 3.0 g./d. and an elongation of 17% was obtained. The fibrils were grown by an air ejector in the same manner as in Example 3, and there was obtained a network web having a monofilament denier of 15–48.

EXAMPLE 5

One part of Uniform AZ, 2 parts of precipitated calcium carbonate and 100 parts of poly(vinyl chloride) having a molecular weight of 60,000 (Geon–8539, The Japanese Geon Company) were mixed with each other in the same manner as in Example 1. The resulting mixture was extruded through a T-die film-making apparatus at a temperature of 140, 150, 155 and 160° C. to give an unstretched film having a thickness of 0.15 mm. and a void ratio of 0.43. The obtained film was stretched to 3.0 times the original length, and the fibrils were grown in the same manner as in Example 3. The obtained network fibrous web had a strength of 1.3 g./d. and an elongation of 16%.

EXAMPLE 6

Three parts of Hydra–8, 5 parts of soft calcium carbonate, and 100 parts of powdery high density polyethylene (Hi-zex 3000S) were mixed with each other in the same manner as in Example 1. The resulting mixture was made into films having a void ratio of 0.51 and a thickness of 0.2 mm. by an air-cooling inflation process. The cell had a width of 0.12 mm., a length of 0.38 mm., and a thickness of 0.04 mm. The obtained film was stretched to 5 times the original length to give a network fibrous web having a strength of 1.9 g./d. and an elongation of 15%.

EXAMPLE 7

One part of Uniform AZ (100% azodicarbonamide, product of Ohtsuka Kagaku Yakuhin Kabushiki Kaisha, Japan), 0.2 part of powdery sodium carbonate, 0.2 part powdery citric acid, 3 parts of soft calcium carbonate, and 100 parts of high density polyethylene (Hi-zex 3000S) having a melt index of 0.9 were mixed with each other, and made into films having a void ratio of 0.22 and a thickness of 0.06 mm. in the same manner as in Example 1. The cell of the film had a width of 0.24 mm., a length of 0.38 mm. and a thickness of 0.01 mm. The film was stretched to 4.8 times the original length, and then developed transversely to make a network web having a monofilament denier of 35.

EXAMPLE 8

One hundred parts of powdery high density polyethylene (Hi-zex 3000S) was mixed with 0.5 part of Hydra–8, 0.1 part of powdery sodium bicarbonate, 0.1 part of powdery citric acid, and 4 parts of precipitated barium sulphate. The resulting mixture was made into films having a thickness of 0.09 mm. and a void ratio of 0.21 with cells having a width of 0.16 mm., a length of 0.62 mm., and a thickness of 0.06 mm. The obtained film was stretched to 5.0 times the original length so as to give a strength of 2.0 g./d. and an elongation of 22%, and developed, with a growth of fibrils, to make a network fibrous web having a monofilament denier of 20.

EXAMPLE 9

Two parts of finely divided powder of iron alum $(Fe_2(SO_4)_3 \cdot (NH_4)_2SO_4 \cdot 24H_2O)$ was mixed with 100 parts of high density polyethylene powder (Hi-zex 3000S), and the resulting mixture was made into films in the same manner as in Example 1. The obtained film had a thickness of 0.05 mm., and a void ratio of 0.52. The cell had a width of 0.3 mm., a length of 0.8 mm. and a thickness of 0.003 mm. The film was then stretched to 5.0 times the original length so as to give a strength of 2.8 g./d., and then developed to make a network fibrous web.

EXAMPLE 10

Three parts of potassium alum powder $$(K_2SO_4 \cdot Al_2(SO_4)_3 \cdot 24H_2O)$$

0.1 part of powdery sodium carbonate, 0.1 part of powdery citric acid, and 100 parts of high density polyethylene powder (Hi-zex 3000S) were mixed with each other in the same manner as in Example 1. The obtained mixture was made into films having a void ratio of 0.21 and a thickness of 0.1 mm. A network fibrous web having a strength of 3.5 g./d. was obtained from this film.

EXAMPLE 11

One hundred parts of commercially available foamed styrol resin containing propane gas as a blowing agent was mixed with the powder of calcined Perlite (95% passed through 300 mesh sieve) in the same manner as in Example 1. The resulting mixture was extruded into films at a barrel temperature of 120° C. and a die temperature of 130° C. The obtained film had a void ratio of 0.55 and a thickness of 0.3 mm. By developing this film, a network fibrous web was obtained.

EXAMPLE 12

Two parts of Uniform AZ, 3 parts of diatomaceous earth, and 100 parts of low density polyethylene (Mirason #55, low density polyethylene product of Mitsui Polychemicals Co., Ltd., Japan) were mixed in the same manner as in Example 1, and extruded into films at a barrel temperature of 130° C. and a die temperature of 150° C. The obtained film had a void ratio of 0.3 and a thickness of 0.08 mm. The film was stretched in warm water at 50° C. to 4.5 times the original length, and developed to make a network fibrous web.

We claim:

1. A process for the manufacture of fibrillated film shaped articles, which comprises incorporating into a film-forming synthetic thermoplastic resin selected from the group consisting of high density polyethylene and polypropylene, a blowing agent selected from the group consisting of azodicarbonamide, hydrazodicarbonamide, a mixture thereof, borax iron alum, and postassium alum before the formation of a film, the amount of gas to be evolved from the said blowing agent per gram of the blowing agent at the film-forming temperature being 30 to 150 ml.; extruding the resulting foamable synthetic resin through a die into a film having closed voids, the average diameter of said closed voids in a direction of thickness being $\frac{1}{40}$ to $\frac{19}{25}$ of the thickness of the film, said foamed film having a void ratio of 0.1 to 0.6; and stretching the resulting film having closed voids at a stretch ratio of 2 to 12 in its longitudinal direction between two pairs of rolls having a different rotating speed, thereby to fibrillate said film.

2. The process according to claim 1 wherein the stretching is carried out at a temperature ranging from room temperature to a point 10° C. lower than the melting point of said film-forming synthetic thermoplastic resin.

3. The process according to claim 1 wherein the thickness of the film before stretching is 0.03 to 0.5 mm.

4. A process for the manufacture of fibrillated film shaped articles, which comprises incorporating into a film-forming synthetic thermoplastic resin selected from the group consisting of high density polyethylene and polypropylene a blowing agent selected from the group consisting of azodicarbonamide, hydrazodicarbonamide, a mixture thereof, borax iron alum and potassium alum before the formation of a film, the amount of gas to be evolved from the said blowing agent per gram of the blowing agent at the film-forming temperature being 30 to 150 ml.; extruding the resulting foamable synthetic resin through a die into a film having closed voids, the average diameter of said closed voids in a direction of thickness being $\frac{1}{40}$ to $\frac{19}{25}$ of the thickness of the film, said foamed film having a void ratio of 0.1 to 0.6; stretching the resulting film having closed voids at a stretch ratio of 2 to 12 in its longitudinal direction between two pairs of rolls having a different rotating speed, thereby to fibrillate said film and developing said fibrillated film to manifest a network fibrillated structure by means of tenter, static electricity or an air ejector.

References Cited

UNITED STATES PATENTS

| | | | |
|---|---|---|---|
| 2,512,463 | 6/1950 | Maier | 264—CPC |
| 2,518,454 | 8/1950 | Elliott | 264—CPC |
| 2,861,898 | 11/1958 | Platzer | 264—CPBA |
| 2,911,382 | 11/1959 | Barkhuff et al. | 264—CPC Dig. |
| 3,003,304 | 10/1961 | Rasmussen | 264—CF Dig. |
| 3,069,367 | 12/1962 | Beaulieu et al. | 264—CPBA Dig. |
| 3,248,462 | 4/1966 | Merrill et al. | 264—53 |
| 3,323,978 | 6/1967 | Rasmussen | 264—CF Dig. |
| 3,403,203 | 9/1968 | Schirmer | 264—321 X |
| 3,416,714 | 12/1968 | Skinner | 264—147 X |

PHILIP E. ANDERSON, Primary Examiner

U.S. Cl. X.R.

161—168, 402; 260—2.5 E; 264—210, 288, 321, Dig. 5, Dig. 8, Dig. 47